United States Patent [19]

Bernstein

[11] Patent Number: 5,591,949
[45] Date of Patent: Jan. 7, 1997

[54] AUTOMATIC PORTABLE ACCOUNT CONTROLLER FOR REMOTELY ARRANGING FOR PAYMENT OF DEBT TO A VENDOR

[76] Inventor: Robert J. Bernstein, First Options, One Financial Plz. 440 S. LaSalle St., Chicago, Ill. 60605

[21] Appl. No.: 369,749

[22] Filed: Jan. 6, 1995

[51] Int. Cl.$^6$ .................................................. G06K 5/00
[52] U.S. Cl. .................. 235/380; 235/379; 235/381; 902/1; 902/2
[58] Field of Search .................... 235/379, 380, 235/381; 902/1, 2

[56] References Cited

U.S. PATENT DOCUMENTS

| | | | |
|---|---|---|---|
| 4,277,839 | 7/1981 | Stuckert | 235/379 X |
| 4,454,414 | 6/1984 | Benton | 235/379 |
| 4,536,647 | 8/1985 | Atalla et al. | 235/379 |
| 4,614,861 | 9/1986 | Pavlov et al. | 235/379 X |
| 4,630,201 | 12/1986 | White | 235/379 X |
| 4,634,845 | 1/1987 | Hale et al. | 235/350 |
| 4,689,478 | 8/1987 | Hale et al. | 235/380 |
| 4,734,858 | 3/1988 | Schlafly | 364/408 |
| 4,906,828 | 3/1990 | Halpern | 235/380 X |
| 4,977,502 | 12/1990 | Baker et al. | 364/405 |
| 5,017,766 | 5/1991 | Tamada et al. | 235/492 |
| 5,025,373 | 6/1991 | Keyser, Jr. et al. | 235/379 X |
| 5,050,207 | 9/1991 | Hitchcock | 379/96 |
| 5,130,519 | 7/1992 | Bush et al. | 235/380 |
| 5,157,717 | 10/1992 | Hitchcock | 379/96 |
| 5,180,902 | 1/1993 | Schick et al. | 235/380 |
| 5,221,838 | 6/1993 | Gutman et al. | 235/379 |
| 5,265,162 | 11/1993 | Bush et al. | 380/24 |
| 5,266,782 | 11/1993 | Alanärä et al. | 235/380 |
| 5,347,580 | 9/1994 | Molva et al. | 235/379 X |

FOREIGN PATENT DOCUMENTS 0186038  7/1986  European Pat. Off. .

Primary Examiner—Donald T. Hajec
Assistant Examiner—Michael G. Lee
Attorney, Agent, or Firm—Welsh & Katz, Ltd.

[57] ABSTRACT

An automatic account controller for remotely arranging for payment of debt to a vendor. The controller includes a detector for activating the portable account controller upon detection of indicia of identity of an authorized user and a selector for selecting a mode of payment to the vendor. The controller further includes a keypad for entering a payment amount, a wireless transceiver for communicating with the vendor, and a processor for executing the selected mode of payment to the vendor through the apparatus for communicating.

22 Claims, 3 Drawing Sheets

AUTOMATIC PORTABLE ACCOUNT CONTROLLER FOR REMOTELY ARRANGING FOR PAYMENT OF DEBT TO A VENDOR

FIELD OF THE INVENTION

The field of the invention relates to portable payment devices and more particularly to electronic devices suited to arranging credit purchases or value transfers.

BACKGROUND OF THE INVENTION

Devices for making purchases without the necessity of cash are known. Such devices range from pre-loaded debit cards (e.g., farecards on public transportation systems) to credit cards. While such devices are similar in some regards, they differ in others. The devices are similar in that they are typically constructed of plastic with a magnetic stripe on one side or the other. They differ in that a farecard is altered during use while a credit card is not.

The farecard is altered during use in that a numerical value (e.g., a dollar value or a number of bus rides) stored on the card is changed during use. Each time that the card is used a value indicative of the value of the use is subtracted from the value stored on the farecard and a new, lesser value is stored on the farecard in place of the original value.

A credit card, instead of storing a numerical suggestion of value on the magnetic stripe of the credit card, provides a promise of future payment of an incurred debt from an authorized user of the credit card. Such devices are also typically constructed of plastic with a visually readable indicia of origin (i.e., VISA, MASTERCARD, etc.) and a magnetic strip. The magnetic strip typically contains an account number of the authorized user of the card. The magnetic strip may also contain a personal identification number (PIN) of the authorized user.

To use a credit card a user simply presents the card to a vendor as an indication of a request for credit. The vendor may simply run the card through an imprinter and ask the user to sign the imprint or the vendor may, in addition, call an issuing bank for an authorization number. In many cases, no attempt is made to verify that the user is, in fact, an authorized user.

Where the credit card is also used as a cash station card, an additional requirement of use may be that the user enter his personal PIN number. However, since the PIN number was already present within the magnetic strip of the credit card and since a person with a card reader and the facilities to decode the magnetic strip may also be able to decode the authorized user's PIN number, the additional requirement of the entry of a PIN number is not a very effective means of preventing fraud.

Smartcards are also known. Smartcards attempt to solve the problem of storing PIN numbers on credit cards by encrypting the PIN number with other numbers such as a public key and/or a time of day and month. Further, an account number of an authorized user may also be encrypted with the same or a different public key as a further deterrent to decryption by an unauthorized user.

Upon receiving a smartcard, a cardreader of a vendor may first read an unencrypted name of an issuing credit card company followed by an encrypted account number of an account of the authorized user and PIN number. A modem interconnected with the vendor's card reader uses the unencrypted name of the issuing credit card company to establish a data link with the issuing credit card company. The modem then transmits the encrypted information to the issuing credit card company which then, using its own version of the public key, decodes the received information.

Upon decoding the received information, the issuing credit card company may authorized the transaction based upon the decoded information or may request that the credit card user enter his PIN number through an associated keyboard. If the issuing credit card company authorizes the sale, the issuing credit card company may transmit an authorization number back to the vendor's modem authorizing the sale.

If the issuing credit card company, as an additional security feature, should also request that the user enter his PIN number, the user would enter his PIN number which the issuing credit card company would then compare with the decoded PIN number and either authorize or decline the transaction. In entering his PIN number through the keyboard of the vendor (or at a cash station) the user risks disclosure of the PIN number to the vendor or nearby onlookers. If the user should forget his card upon leaving the vendor's place of business, or should be later pick-pocketed by an onlooker of the transaction, the security offered by the card may be completely compromised.

Credit cards in general have become an indispensable part of the world economy. Because of the importance of credit or other cashless transactions a need exists for a method of accomplishing such transactions without the risk of publicly disclosing confidential information such as PIN number that are otherwise used to protect credit accounts.

SUMMARY OF THE INVENTION

It is a primary object of this invention to provide an apparatus for making cashless purchases that cannot be used except by an authorized user.

It is a further object of the invention to provide an apparatus for making cashless purchases that does not require the public entry of personal identification numbers.

It is a further object of the invention to provide an apparatus for making cashless purchases that can be used to make direct value transfers for inexpensive purchases that does not require an interconnection to an external credit verification network.

These and other objects are provided by an automatic portable account controller for remotely arranging for payment of debt to a vendor. The controller includes means for activating the portable account controller upon detection of indicia of identity of an authorized user and means for selecting a mode of payment to the vendor. The controller further includes means for entering a payment amount, means for communicating with the vendor, and means for executing the selected mode of payment to the vendor through the means for communicating.

The solution to the problem of security in credit purchases lies, conceptually, in the use of a portable account controller for remotely arranging for payment of debt (portable purchasing device) carried by the authorized user which has the capability of encrypting information (e.g., account number, PIN number) transmitted over public communication facilities (e.g., telephone lines). The portable purchasing device, under an embodiment of the invention, is equipped with its own security features preventing use by other than an authorized user. Such security features appropriate for the portable purchasing device may require identification of a user through a retinal or fingerprint scan, or entry of a local PIN number (i.e., different from the transmitted PIN number).

Upon activation of the portable purchasing device by retinal scanning, fingerprint identification or entry of a local PIN number, the security features of the portable purchasing device may cause the portable purchasing device to remain active for a fixed time interval (e.g., one hour) or deactivate after a single purchasing transaction. If the security feature of the portable purchasing device were based upon fingerprint identification or acoustic analysis of the bone structure of a hand holding the portable purchasing device, the device may remain active for so long as the portable purchasing device were held by the authorized user. If the security feature were based upon a local PIN number or other biotic parameters of the authorized user that cannot be continuously measured (e.g., retinal scanning), then periodic reactivation would be required.

Under the invention the portable purchasing device interacts with a vendor through a communication port. The communication port may be infrared (IR), radio frequency (RF), or simply a telephone jack. Upon deciding to make a purchase from a vendor, an authorized user would place the portable purchasing device in an appropriate location for exchanging information through the communication port. If the communication port were IR or RF the user may simply place the portable purchasing device in a cradle where a transceiver of the communication port of the portable purchasing device is in opposing relationship with a transceiver of a communication port of the vendor. Likewise, if the communication port were a telephone jack, the user would simply interconnect the portable purchasing device with a telephone cord of the vendor.

Upon interfacing the portable purchasing device with the communication facilities of the vendor, transfer of value for a purchase may occur under any one of a number of possible modes selectable by the user and acceptable to the vendor. At a first, and simplest level, the user of the portable purchasing device transfers value directly to the vendor in a manner similar to the transfer of electronic cash, but without the assistance of a bank.

Under the embodiment, to make a direct payment from cash memory, (i.e., via off-line mode) the user of the portable payment device selects "direct value transfer" from a menu on a display of the portable payment device. The user then enters an amount for direct transfer. Once the portable purchasing device is placed in a position to facilitate the exchange of information (e.g., the vendor provides a payment cradle where the port of the portable communication device is positioned proximate a communication port of a data processing system of the vendor), the portable payment device signals the vendor communication port with a "ready" prompt. When the vendor port responds, the portable purchasing device signals the mode of payment as direct transfer. The vendor communication port transfers the mode of payment to the vendor data processing system (herein referred to as an electronic cashbox) which then queries the vendor through the vendor's local display whether direct payment is acceptable. If the vendor enters a favorable response (e.g., "Y" or simply presses ENTER) at a keyboard of the vendor's electronic cashbox, the vendor's communication port signals the portable purchasing device that the transaction has been accepted and the transaction is completed.

Direct payment may also occur where the user places his portable purchasing device upon a payment cradle and the vendor transmits a price to the portable purchasing device. The user may press an "OK" key (e.g., enter) transferring payment to the vendor or the user could add a percentage to the total (e.g., a tip) before authorizing payment.

Alternatively, the user of the portable purchasing device may decide to pay by credit or may pay by transferring cash from a bank account of the authorized user to a bank account of the vendor (i.e., via on-line mode). In either case the user places the portable purchasing device in a purchasing cradle and the portable purchasing device arranges payment through the communication facilities (e.g., telephone lines) of the vendor. The portable purchasing device accomplishes such mode of payment by first passing a telephone number of the user's bank or credit source to the vendor's payment receipt system.

Upon receiving the telephone number the vendor's system may first check that the telephone number is that of a financial institution recognized as a good credit risk by the vendor before accepting payment from such institution. Upon completing such checks, the vendor's system passes the telephone number to the local public switch telephone network (PSTN) for connection to the selected financial institution. Following completion of the connection with the selected institution, the vendor's system and portable purchasing device monitor the connection for transmissions and respond as appropriate to the selected mode of payment.

Whatever the selected mode of payment, the portable purchasing device must first uniquely identify itself to the selected financial institution (i.e., a bank or the vendor's house account) before the transaction may be completed. However, since the vendor is monitoring the connection, steps must be taken to ensure the security of access to the authorized user's bank accounts.

The portable purchasing device may do this by first transmitting an identifier (e.g., a social security number, account number, etc.) of the authorized user. Once the authorized user has been identified to the bank, the bank may use such identification to access a file of the authorized user for a set of encryption keys to decode subsequent transmissions from the portable purchasing device. The portable purchasing device using an identical set of encryption keys encodes further indicia of identity (e.g., a PIN number) for transmission to the bank which may only be decoded by the bank. The portable purchasing device may also encode other information (i.e., mode of payment to the vendor and payment amount) transmitted to the bank. The bank, upon decoding the transmission, responds in the clear (i.e., no encryption) with an acceptance or rejection message (or with a request for re-transmission if an error occurred).

The vendor's system, monitoring the connection, receives the acceptance message, and transmits an appropriate response. If the transaction were a credit purchase the vendor's system may transmit a merchant number, amount of purchase, and a request for a credit authorization number. If the purchase involved a cash transfer to a vendor bank account, the vendor may respond with indicia of identity of the vendor's bank and bank account number along with an expected amount of the transfer. The authorized user's bank, upon receiving the response from the vendor, compares the amount of purchase transmitted by the portable purchasing device to the expected amount from the vendor and, if the amounts match, completes the transaction.

Further objects, features and advantages of the present invention will become apparent from the following detailed description of the invention taken in conjunction with the accompanying drawings wherein like reference numerals designate like elements throughout the several views.

DESCRIPTION OF A PREFERRED EMBODIMENT

Figure 1:
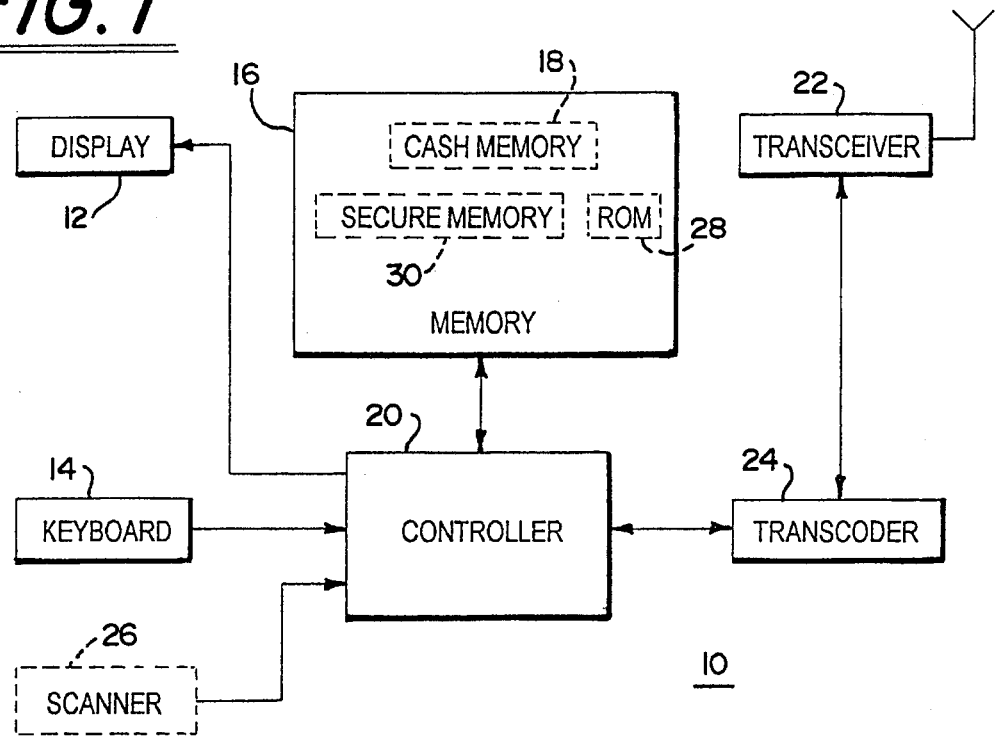
FIG. 1 is a block diagram of a portable purchasing device in accordance with a preferred embodiment of the present invention.

FIG. 1 is a block diagram of a portable purchasing device 10, in general. A controller 20 receives input information from a keyboard 14 (or optional scanner 26) and displays information on display 12. Program instructions for the portable purchasing device 10 are stored within a memory 16 and loaded into the controller 20 upon activation. The portable purchasing device 10 interacts with external devices through a transcoder 24 and transceiver 22.

The transceiver 22 may exchange information in the IR range or in the visible range through use of an appropriate light emitting diode (LED) and photodetector. The transceiver may also operate in the RF range using amplitude modulation (AM), frequency modulation (FM), quadrature amplitude modulation (QAM), or any other appropriate modulation technique. The transceiver 22 may also interact with external devices directly through modem and telephone jack.

Figure 4:
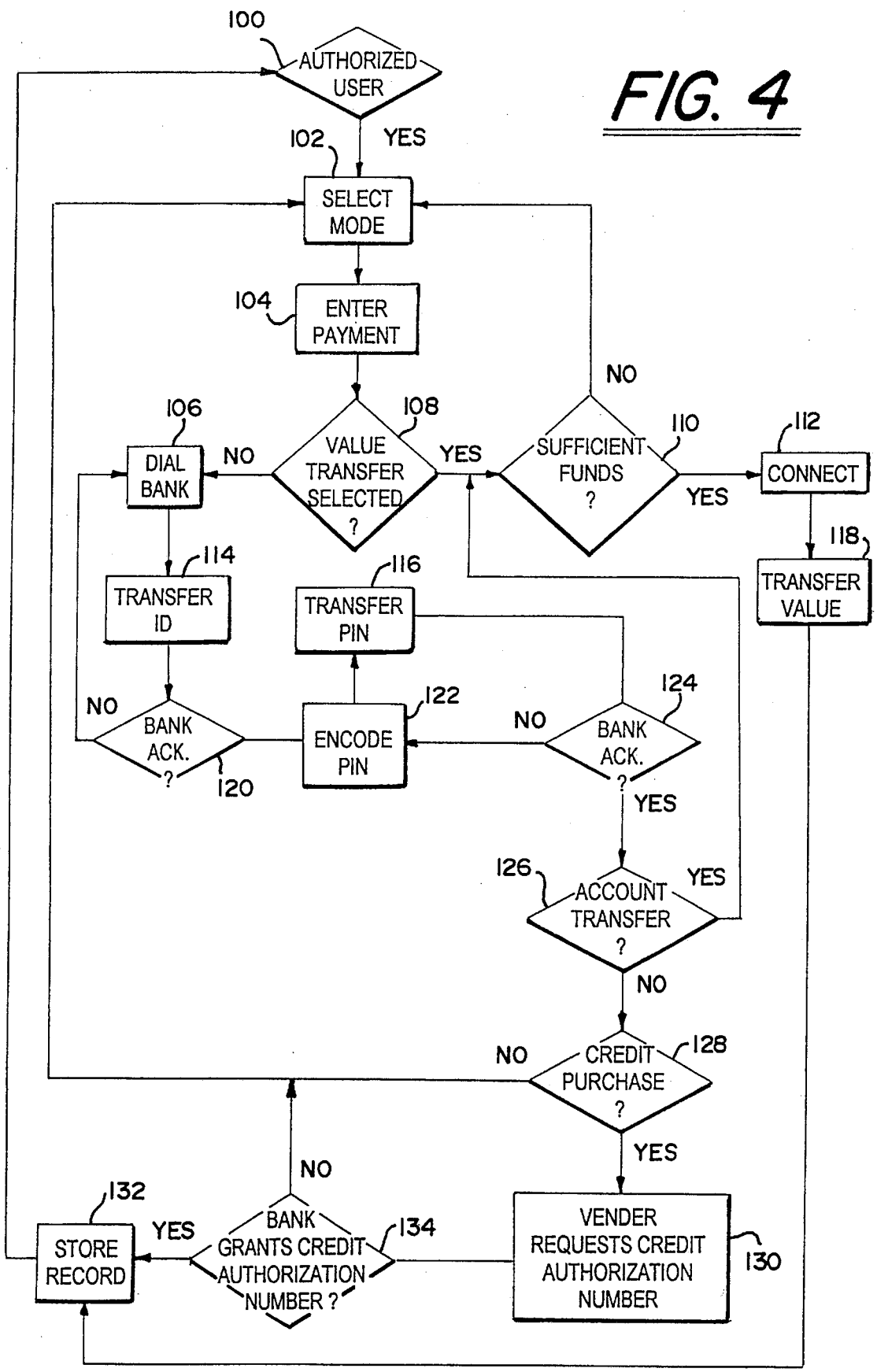
FIG. 4 is a flow chart of the steps of operation of the portable purchasing device of FIG. 1.

The portable purchasing device 10 under an embodiment of the invention is typically programmed under the auspices of an issuing bank for the benefit of its customers. FIG. 4 is a flow chart showing, in summary form, the program steps of a portable purchasing device 10 under an embodiment of the invention. Reference will be made to FIG. 4 as appropriate to an understanding of the invention.

As part of the programming of the portable purchasing device 10 the issuing bank may enter a numerical value in a cash memory 18 of the memory 16 of the portable purchasing device 10. The numerical value represents a cash value that the authorized user of the portable purchasing device has received from the issuing bank, and which the bank has stored in the portable purchasing device for purposes of making direct value transfers to vendors. The cash memory area of the memory 16 is not accessible to a user except for withdrawals. The cash memory 18 is protected by a set of passwords known only to the bank. Additions to the value stored in cash memory 18 must be performed under the control of a bank or other authorized institution (which act as a guarantor of the value originally stored within the portable purchasing device 10) and which possesses the passwords that allow access to a store algorithm used by the portable payment device.

Electronic cash is limited to some maximum value (e.g., $100.00) and is used primarily to pay debts where verification of credit worthiness is not practical (e.g., payment of bus fare, purchasing a newspaper, etc.). Electronic cash is also used where the context of the transaction requires that payment be made as quickly as possible.

Stored with the cash value in the portable purchasing device 10 is an identifier of the bank storing the most recent cash deposit to the portable purchasing device as well as any previously storing banks and electronic cash remaining from the previous deposit. Also stored within cash memory to provide an audit trail of proper operation of the portable purchasing device 10 is a summary of the most recent deposit to cash memory as well as identifiers of vendors to which dispersements were made and the times and dates (temporal indicia) of such dispersements.

Also entered into a secure area 30 of memory 16 is a telephone number of the issuing bank as well as numbers of various bank accounts of the authorized user. A set of encryption keys are also stored within secure memory 30. The encryption keys may be any non-repeating number sequence (e.g., a public key).

The program under which the portable purchasing device 10 operates is loaded into a read only memory (ROM) 28 of the portable purchasing device 10 during manufacture by methods well known in the art. The program (FIG. 4) may be activated by pressing any key on the keyboard 14 of the portable purchasing device 10. Following activation of any key the portable purchasing device 10 enters a program step 100 where the portable purchasing device waits a time period (e.g., 30 seconds) for entry of indicia of an authorized user. If the portable purchasing device 10 does not receive the proper indicia of the authorized user within the 30 seconds (or if the entered indicia is incorrect) the device 10 again deactivates.

The indicia of the authorized user may be any alphanumeric or biotic parameter capable of input through the keyboard 14 or optional scanner 26 and a summary of which may be stored within memory 16. The indicia of the authorized user may be a local PIN number of may be the same PIN number that is later encoded and transmitted to an issuing bank.

Where the indicia of the authorized user is entered through the scanner 26, the indicia may be a fingerprint of the authorized user or where the scanner 26 is a retinal scanner the indicia may be the image of the authorized user's retina. Where the scanner 26 is an acoustic scanner, distinguishable differences in the bone structure of the authorized user's hand may be scanned and stored as the indicia of the authorized user.

Following activation, the portable purchasing device 10 waits for the user to select 102 a mode of payment. The possible modes of payment may be displayed on the display 12 in the form of a menu. Mode selection 102 may be accomplished by entering a numerical value displayed beside a menu item, or where a touch-screen is used for the display 12, the selection may be accomplished by the user touching an appropriate part of the menu on display 12.

Following mode selection 102, the portable purchasing device 10 wait for entry of a purchase amount. The purchase amount is typically entered as a dollar value through the keyboard 14 or through a touch-screen display 14 by touching appropriate symbols on the display 14.

Following entry of a dollar value a controller 20 executes the selected payment. As a first step, the controller checks whether a direct value transfer has been selected 108. If so, the controller verifies 110 that a sufficient balance remains within cash memory 18 for payment of the debt.

If a sufficient balance remains within cash memory 18, the controller 20 causes a connect tone to be transmitted by transceiver 22. The connect tone transmitted by the transceiver 22 of the portable purchasing device 10 is detected by a transceiver 62 of the vendor's electronic cashbox 50 and transferred to a controller 60 of the cashbox 50. The controller 60, upon detecting the connect tone, responds with an acknowledge.

The portable purchasing device 10 upon receiving the connect tone transmits a serial number of the portable purchasing device 10 as well as an entered payment value. The serial number of the portable purchasing device 10 contains, embedded within, a serial number of the issuing bank as well as a sequence number uniquely identifying the portable purchasing device 10. The vendor's cashbox 50 first checks by reference to memory 56 whether the issuing bank is in good standing with the vendor as far as honoring direct value transfers. The vendor then checks that the portable purchasing device is an appropriate model compatible with the cashbox 50 and that the payment amount is of a proper value.

If the vendor cashbox 50 finds the transaction acceptable, the cashbox 50 transmits, through the transceiver 62, a proceed command to the portable purchasing device 10 that contains a unique identifier of the cashbox 50. The portable purchasing device 10 responds by executing a value transfer 112 by transmitting a transaction number to the cashbox 50 which may be a combination of the identifier of the portable purchasing device 10, the identifier of the cashbox 50 and a numerical value of the transaction as well as certain other encrypted digits that may be used for transaction certification. The encrypted digits may be a combination of the identifiers of both portable purchasing device 10, cashbox 50, the time and date (encrypted temporal indicia) of the transaction, and the amount of the transaction all encrypted through use of a public key known only to the issuing bank and portable purchasing device 10.

The vendor's electronic cashbox 50 upon receipt of a transaction number of a direct value transfer stores the transaction number in a cash transfer file 57 of a memory of the electronic cashbox 50 for later redemption. Redemption of direct value transfers are periodically done at the vendor's convenience. The vendor may redeem direct transfers by transmitting a summary of all transaction numbers to the vendor's bank through the cashbox controller 60, modem 64 and PSTN, or the vendor may simply download the transaction numbers to a floppy disk and take such floppy disk to the vendor's bank with the vendor's other daily receipts or the vendor may transfer such information from his memory device (e.g., a hard disk) to the banks memory device (e.g., another hard disk) through an appropriate data transfer (i.e., downloading between disk drives).

The vendor's bank upon receiving the summary of transaction numbers, first retrieves an identifier of the bank issuing the portable purchasing device 10, and a purchase amount, from the transaction number. The vendor's bank may then transmit a summary of charges to the issuing bank for credit to the vendor's account. The issuing bank may immediately issue a credit or wait until the portable purchasing device 10 downloads its summary of purchases for comparison with transaction numbers received from vendor's banks.

If the summary from the portable purchasing device 10 contains a purchase record that matches a charge from a particular vendor then the vendor's account is credited. If the summary does not match, then the issuing bank requests a full copy of the transaction number including the encrypted digits for transaction certification. The issuing bank decodes the encrypted digits and temporal indicia to verify that the request for credit is legitimate. If the request is legitimate (as determined by the content of the decoded digits within the transaction number) the issuing bank credits the vendor's account.

Encryption and decryption in accordance with an embodiment of the invention may be accomplished under any of a number of well known standards. For example the data encryption standard (DES) may be used. DES works by breaking messages into discrete blocks of information (usually 8 characters having 64 bits) and transforming them into blocks of ciphertext according to a 56 bit "key".

Decryption (decoding) requires that the same key by used for converting the ciphertext back into the original message. Before storing a transaction number a portable purchasing device can encrypt a message using a key known solely to the portable purchasing device 10 and the issuing bank for which the encrypted bits are intended. Theft of the transaction numbers would do a thief no good, because without the key the encrypted bits of the transaction number are digital gibberish.

If the mode of payment entered into the portable purchasing device 10 is not direct value transfer, then the portable purchasing device 10 next transfers a telephone number of the authorized user's bank to the vendor. The vendor checks the authenticity of the telephone number before transferring the number to the PSTN. When a connection is established through the PSTN with a bank of the authorized user and the vendor, the bank transmits a connect tone and the vendor adds the portable purchasing device to the connection with the bank through the PSTN. The portable purchasing device 10 responds by transmitting an identifier 114 which identifies the authorized user to the bank. The identifier may be a customer number, a social security number, a bank account number, a combination of such numbers, or some other appropriate identifier number. Upon receiving the identifier, the bank responds 120 with an acknowledge. If the bank does not respond with an acknowledge within a reasonable time (e.g., one second) the portable purchasing device 10 re-dials the bank and tries again.

Upon receiving an acknowledge 120 from the bank, the portable purchasing device 10 encrypts and sends a security number and payment value. Where the identifier transmitted to the bank is a bank customer number or social security number of the authorized user, then the encrypted security number would be a bank account number. Where the identifier is an account number then the encrypted security number is a PIN number. Where an authorized user has multiple accounts with a bank then the user would want to use an identifier comprising a customer number or social security number as an identifier and fan account number as the security number. In such a case the authorized user's PIN number would become an alternate security number providing additional levels of security against fraud.

The identifier transmitted to the bank allows the bank to access an encryption file of the authorized user of the portable purchasing device 10. Contained within the encryption file are identifiers of public key encryption codes that are also stored within secure memory 30 of the portable purchasing device 10 and which are used by the portable purchasing device 10 to encrypt the security number(s). Encryption in accordance with an embodiment of the invention is performed under processes that are well known in the art within the transcoder 24.

Upon identification of the authorized user and receipt of the encrypted security number, the bank uses the encryption keys of the authorized user to decode the security number and payment amount. (Decoding of the encrypted information is also performed using methods well known in the art.) Following decoding, the bank acknowledges 124 successful decoding of the security number by transmitting a security code acknowledge message. Using the security number, the bank then determines whether the user account number is a cash account or a credit account. If the account is a cash account, the bank verifies 110 that the authorized user has sufficient funds to cover the payment amount and, if so, transmits a request to the vendor cashbox 50 for an identity of a target account into which to transfer the payment. The vendor cashbox 50 responds with a indicia of a vendor account designated to receive payments (e.g., wire transfer number or bank and bank account number). Upon receipt of the indicia of the vendor's account, the user's bank executes the transfer. A transfer receipt may be returned to the vendor cashbox 50 and stored for later verification of the transfer and as a tracking tool should be transfer be ineffective. The transfer receipt and record of the transaction is also stored 132 by the portable purchasing device 10.

If, upon examining the decoded account number from the portable purchasing device 10, the user's bank determines that the account is a credit account, the bank first determines whether any payments are overdue on the account or if the account is over the credit limit. If so, the user's bank may decline 122 the purchase and request that the portable purchasing device 10 choose another mode of payment.

If the credit account is up-to-date, then the user's bank transmits a "purchase accepted" message back to the vendor's cashbox 50. The vendor's cashbox may then transmit 130 a request for a credit authorization number. The user's bank responds 134 with a credit authorization number, which number is stored by both the vendor's cashbox 50 and the portable purchasing device 10. In addition, the portable purchasing device 10 creates a record of the transaction including time and date and the amount of the transaction.

If the vendor is a cash dispensing station, then the procedure is quite similar, except for the manner of interfacing with the cash dispensing station. Since most cash dispensing stations require that a credit or cash card be inserted into a slot, a cash dispensing station designed to operate in conjunction with the portable purchasing device 10 is modified to include a transceiver or phone jack.

Figure 2:
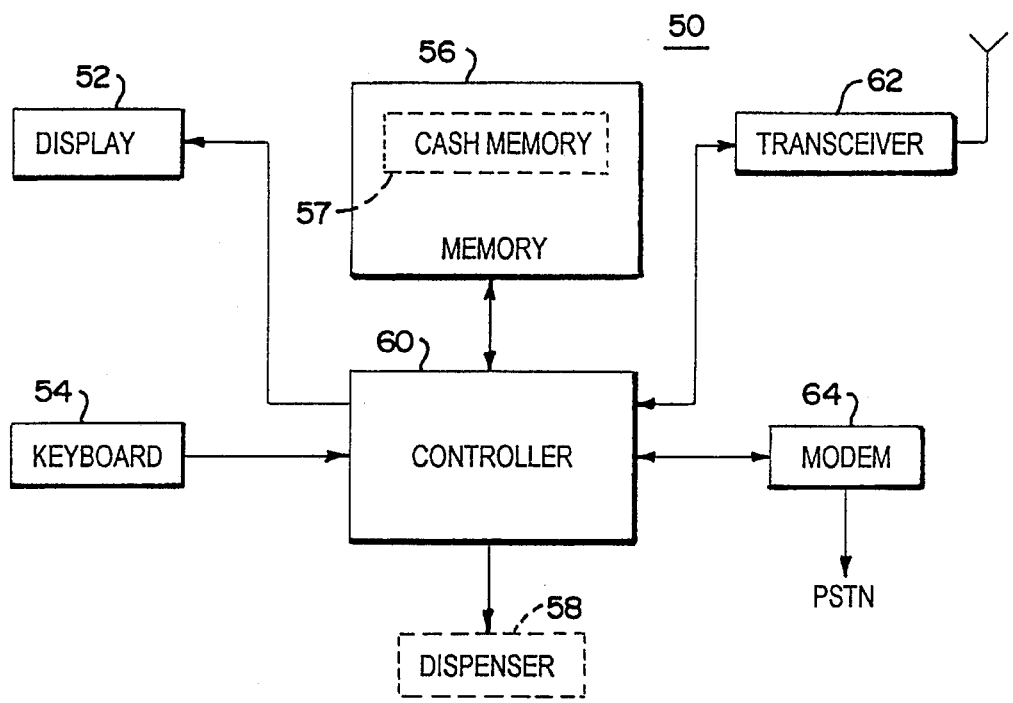
FIG. 2 is a block diagram of a vendor cashbox for use with the portable purchasing device of FIG. 1.

Under the invention, the modified cash station has a similar structure to that shown in FIG. 2 wherein the dispenser 58 is, in this case, a cash dispenser. Under the invention and to interface with a cash dispensing station, the portable purchasing device 10 may operate under either of two modes. Under the first mode, the portable purchasing device 10 transfers an account number, a PIN number, and a cash request value to a controller of the cash dispensing station 50 through the transceiver 62. Under the first mode, the controller 60 of the cash dispensing station 50 functions as if the account number had been received from a card reader (used in place of the transceiver 62) and the PIN number and cash advance value were entered through the keyboard 54 (instead of the transceiver 62) all consistent with operation under the prior art. The controller 60 of the cash dispensing station 50 transfers the user information through a local area network (LAN) including the modem 64 and PSTN lines to a controlling bank (not shown) which then processes the information as under the prior art. The controlling bank, through its own data processing network, interfaces with a bank of the authorized user to arrange for account transfers or charge account debits consistent with prior art practices. Upon validating the request from the cash dispensing station 50 the controlling bank (again through the LAN) instructs the controller 60 to dispense the requested cash through the cash dispenser 58.

Under the second mode of operation, the cash dispensing station 50 operates as a stand-alone device, without the need for a controlling bank. The cash dispensing station relies on account transfers into its own bank account from the bank of the authorized user for protection against fraud. The cash transfers may be from a cash account of the authorized user or may be from a credit card account of the authorized user.

Under the second mode, the portable purchasing device 10 interacts with the cash dispensing station 50 as previously described for a vendor accepting cash transfers. The portable purchasing device 10 transfers a telephone number of a user bank to the cash vending station 50, the cash vending station 50 verifies the number before establishing a connection with the user bank, and the portable purchasing device transfers appropriate account and security numbers to cause the user bank to perform an account transfer to a bank account of the cash vending station 50. A verification message of such account transfer causes the cash vending station 50 to dispense cash as requested.

Figure 3:
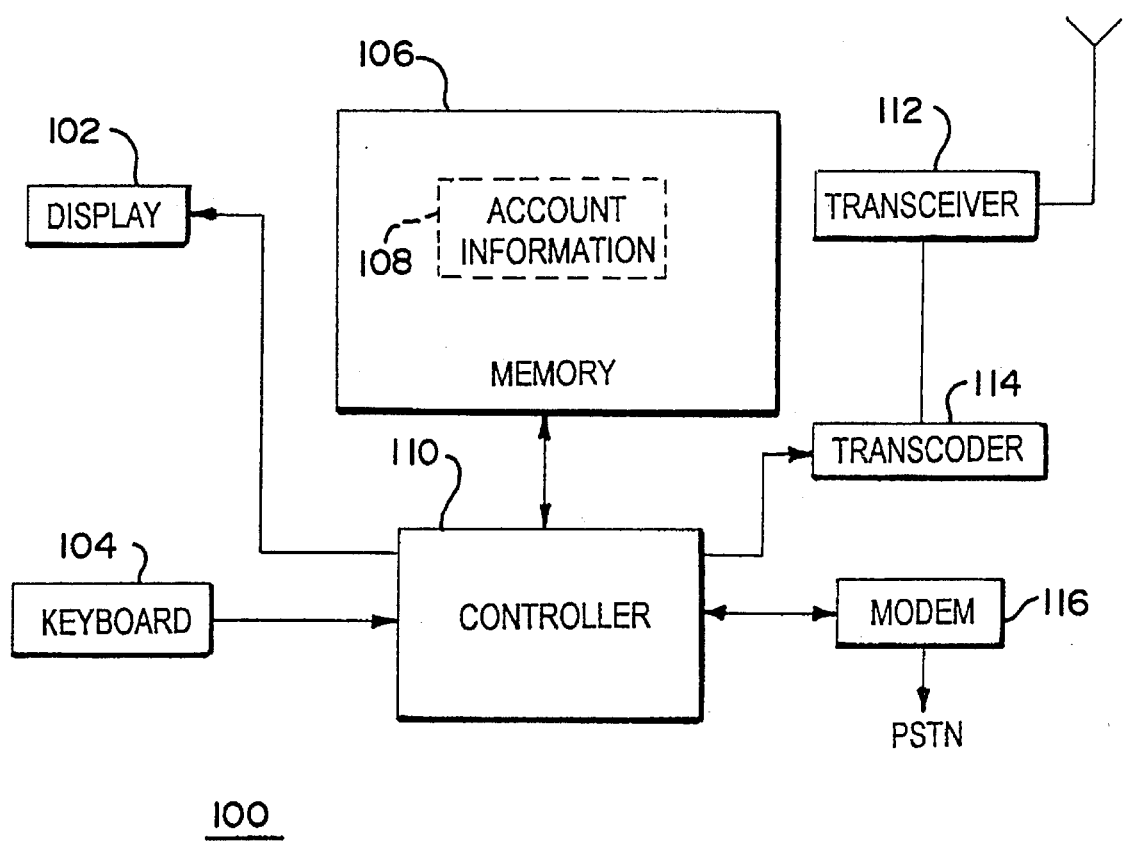
FIG. 3 is a block diagram of a system for programming a cash memory of the portable purchasing device of FIG. 1.

In another embodiment of the invention, an apparatus 100 (FIG. 3) is provided under the control of a user's bank for adding value to the cash memory 18 of the portable purchasing device 10. Under the embodiment, the portable purchasing device 10 is placed in a transfer cradle (not shown) at the user's bank and the system 100 activated. The system 100 establishes itself as system manager of the portable purchasing device 10 by transmitting identifying passwords through a transceiver 112 of the user's bank to the transceiver 22 of the portable purchasing device 10. Upon establishing itself as system manager, the system 100 of the user's bank may download from cash memory 18 to the bank a prior history of all value transfers that have previously been made from the portable purchasing device 10 to vendor cashboxes 50. The system 100 may also transfer additional cash value from a bank account 108 of the authorized user to the cash memory 18 of the portable purchasing device 10.

In another embodiment of the invention, the memory 16 of the portable purchasing device 10 may contain a digitized picture of the authorized user. Under the embodiment, the controller 20 retrieves the picture from memory 16 and transfers the picture to a CRT display 52 of the vendor's cashbox before the vendor accepts payment for the purchase. Display of a picture of the authorized user, in advance of purchase, further alerts a vendor to potential fraud in the use of cashless purchasing devices.

In another embodiment of the invention, the transaction number transferred from the portable purchasing device 10 to a vendor's cashbox 50 contain additional encrypted bits that may be decoded by the controller 60 the vendor's cashbox 50. The additional bits are encrypted under a key known to both portable purchasing device 10 and to the vendor's cashbox 50. The additional bits are encoded by the portable purchasing device 10 with a time and a date of the purchase as a deterrent to copying of data transmissions and as a means of preventing the fraudulent use of a data recording devices for purchasing purposes.

While a specific embodiment of an apparatus for remotely arranging for payment of debt to a vendor, and its manner of operation, have been illustrated and described, it should be understood that variations and modifications of the invention in its various aspects will be apparent to those skilled in the art, and that the invention is not limited by the specific embodiments described. It is therefore contemplated to cover by the present invention any modifications, variations, or equivalents that fall within the true spirit and scope of the basic underlying principles disclosed and claimed herein.

What is claimed is:

1. An automatic portable account controller for remotely arranging for payment of debt to a vendor comprising in combination: means for activating the automatic portable account controller upon detection of indicia of identity of an authorized user; means for selecting direct value transfer as a mode of payment to the vendor via off-line mode; means for selecting credit purchase as a mode of payment to the vendor via off on-line mode; means for selecting bank account transfer as a mode of payment to the vendor via on-line mode; means for entering a payment amount; means for communicating with the vendor; and means for executing the selected mode of payment to the vendor through the means for communicating.

2. The account controller for remotely arranging for payment of debt of claim 1 wherein the means for communicating with the vendor further comprises a radio frequency transceiver.

3. The account controller for remotely arranging for payment of debt of claim 1 wherein the means for communicating with the vendor further comprises an infrared transceiver.

4. The account controller for remotely arranging for payment of debt of claim 1 wherein the means for communicating with the vendor further comprises a telephone jack.

5. The account controller as in claim 1 wherein the means for executing the mode of payment to the vendor of the direct value transfer further comprises a controller for transferring value from a cash memory of the portable account controller to a memory of the vendor.

6. The account controller of claim 1 wherein the means for executing a mode of payment to the vendor of the cash transfer from a bank account of the authorized user to a bank account of the vendor further comprises a controller for transferring at least an account number of the authorized user to the bank of the authorized user.

7. The account controller as in claim 6 wherein the controller further comprising means for encrypting the account number of the authorized user.

8. The account controller of claim 6 wherein the controller further comprising means for communicating a personal identification number to the bank of the authorized user.

9. The account controller as in claim 8 wherein the controller further comprising means for encrypting the personal identification number of the authorized user.

10. The account controller of claim 1 wherein the means for executing the mode of payment of credit purchase from the vendor further comprising a controller for communicating an account number of the authorized user to a credit source.

11. The account controller as in claim 10 wherein the controller further comprising means for encrypting the account number of the authorized user.

12. The account controller of claim 10 wherein the means for executing the mode of payment of credit purchase from the vendor further comprising a controller for communicating a personal identification number of the authorized user to the credit source.

13. The account controller as in claim 12 wherein the controller further comprising means for encrypting the personal identification number of the authorized user.

14. The account controller as in claim 10 wherein the controller further comprises a means for requesting a credit authorization number from the credit source for transmission to the vendor.

15. The account controller as in claim 1 further comprising means for encrypting temporal indicia of the transaction.

16. The automatic portable account controller of claim 1 further comprising a vendor's cashbox operably interconnected with the account controller at a point of purchase for receiving a direct value transfer.

17. The vendor's cashbox as in claim 16 further comprising means for decoding the temporal indicia of the transaction and declining the transaction where the temporal indicia do not match a time of the transaction.

18. The account controller for remotely arranging for payment of debt as in claim 1 wherein the vendor further comprises a cash dispensing station and the means of executing the mode of payment further comprises a controller for transferring cash from a bank account of the authorized user to a bank account of a controlling bank of the cash station.

19. The account controller of claim 18 further comprising a controller for communicating at least an account number of an authorized user to a bank of the authorized user.

20. The account controller for remotely arranging for payment of debt as in claim 19 further comprising means for encrypting the account number of the authorized user.

21. The account controller for remotely arranging for payment of debt as in claim 20 further comprising means for encrypting the personal identification number of the authorized user.

22. The account controller of claim 18 further comprising means for communicating a personal identification number of the authorized user to the bank of the authorized user.

\* \* \* \* \*